No. 770,878. PATENTED SEPT. 27, 1904.
D. R. VIVION.
GAGE PLATE ATTACHMENT FOR PLANTERS AND DRILLS.
APPLICATION FILED DEC. 24, 1903.
NO MODEL. 2 SHEETS—SHEET 1.
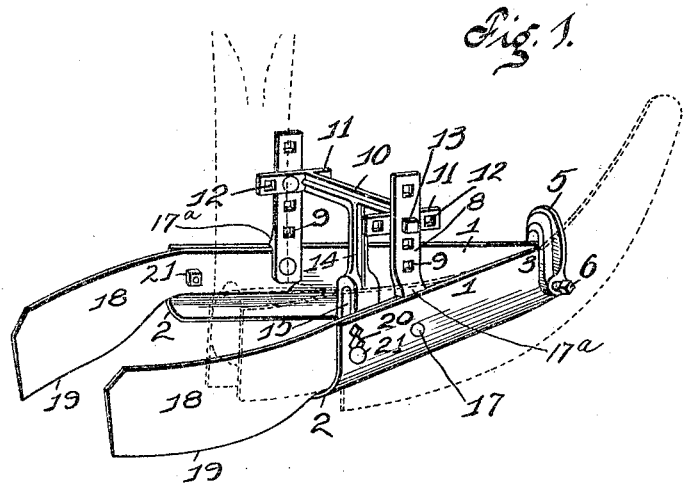
Fig. 1.
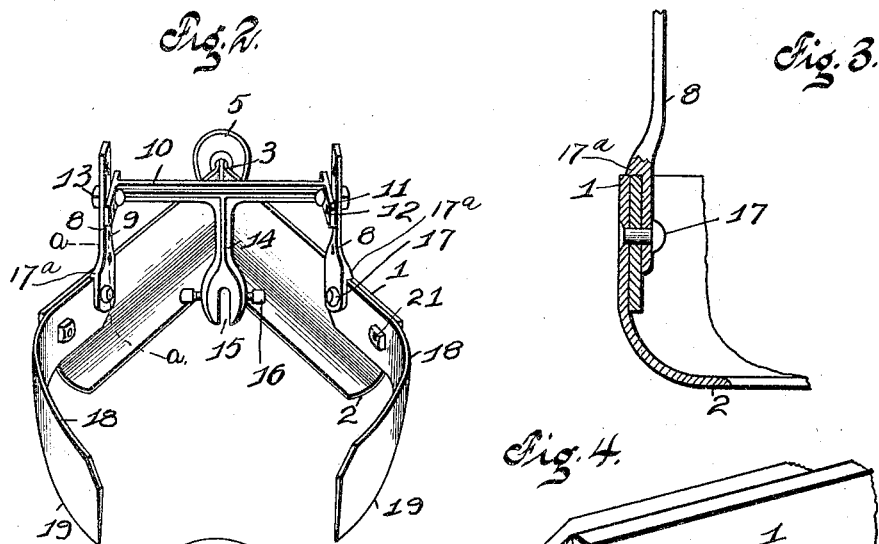
Fig. 2. Fig. 3.
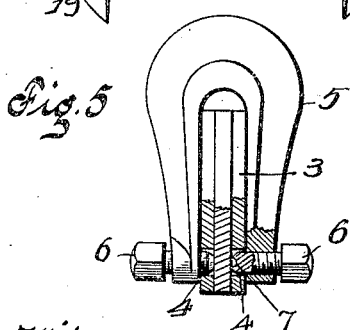
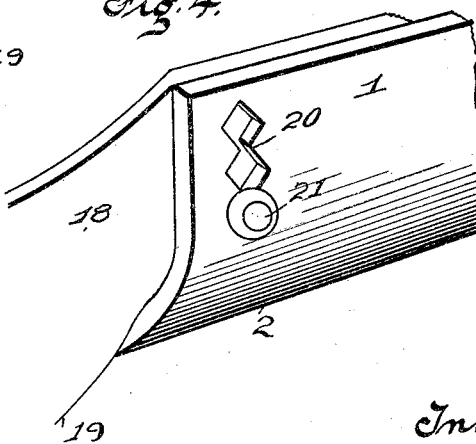
Fig. 5. Fig. 4.
Witnesses
Alfred A. Eirks
M. Shim
Inventor.
David R. Vivion.
By Higdon & Longan & Hopkins
Attys.

No. 770,878. PATENTED SEPT. 27, 1904.
D. R. VIVION.
GAGE PLATE ATTACHMENT FOR PLANTERS AND DRILLS.
APPLICATION FILED DEC. 24, 1903.
NO MODEL. 2 SHEETS—SHEET 2.
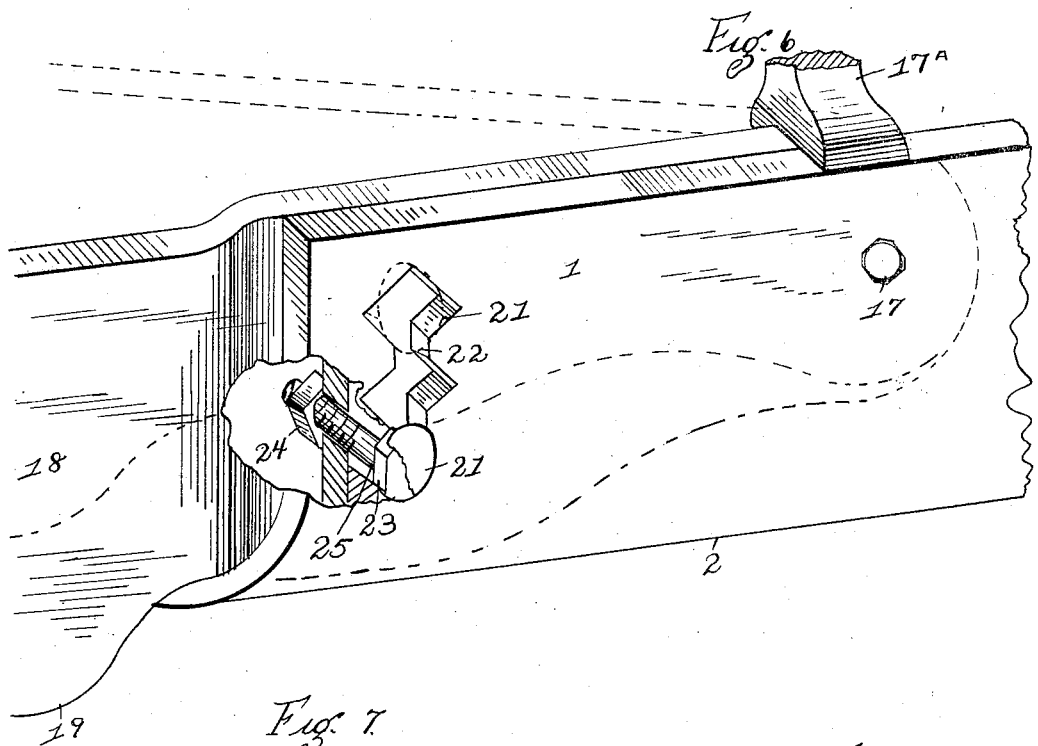
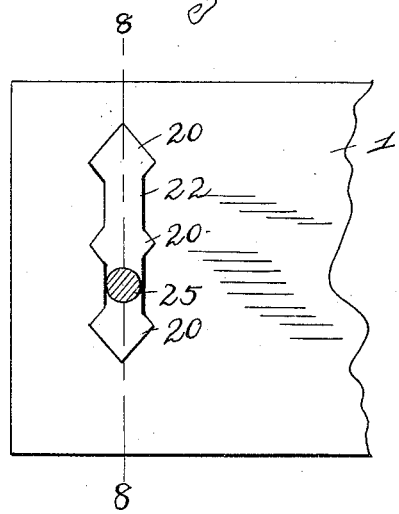
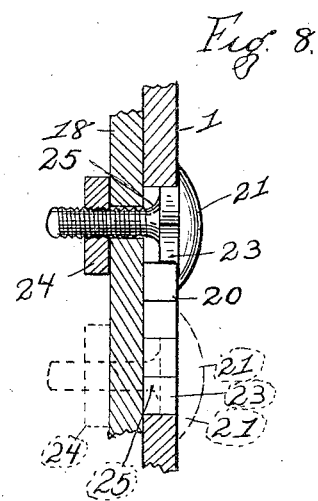
WITNESSES: Edw. M. Harrington
Alfred ...
INVENTOR: David R. Vivion
By Higdon, Longan & Hopkins Attys No. 770,878.         Patented September 27, 1904.

UNITED STATES PATENT OFFICE.

DAVID R. VIVION, OF COLUMBIA, MISSOURI.

GAGE-PLATE ATTACHMENT FOR PLANTERS AND DRILLS.

SPECIFICATION forming part of Letters Patent No. 770,878, dated September 27, 1904.

Application filed December 24, 1903. Serial No. 186,469. (No model.)

*To all whom it may concern:*

Be it known that I, DAVID R. VIVION, of the city of Columbia, Boone county, State of Missouri, have invented certain new and useful Improvements in Gage-Plate Attachments for Planters and Drills, of which the following is a full, clear, and exact description, reference being had to the accompanying drawings, forming a part hereof.

My invention relates to gage-plate attachments for planters and drills; and it consists of the novel features herein shown, described, and claimed.

In the drawings, Figure 1 is a perspective of my improved gage-plate attachment, the corn-planter runner or furrow-opener being shown in operative position in dotted lines. Fig. 2 is a rear perspective of the gage-plates ready for attachment to the planter-runner. Fig. 3 is a sectional view taken on the line *a a* of Fig. 2. Fig. 4 is a perspective, upon an enlarged scale, showing the adjustable connection between the hoe and the gage-plate. Fig. 5 is a cross-section of the runner or furrow-opener, showing the means of connecting the gage-plate to the runner. Fig. 6 is a view analogous to Fig. 4, upon a still larger scale, the adjustable connection being shown in section. Fig. 7 is a detail illustrating the operation of the adjustable connection, the clamping-bolt being shown in section and the gage-plate in elevation. Fig. 8 is a vertical section on the line 8 8 of Fig. 7.

Referring to the drawings in detail, the gage-plates 1 are adapted to be connected to the planter-runner at their forward ends, said gage-plates being curved inwardly to the arc of a circle in cross-section, as shown in Fig. 3, the lower edges 2 of said plates occupying substantially horizontal positions. As before suggested, the gage-plates are mounted upon opposite sides of the planter-runner, and they are adapted to slide upon the ground and regulate the depth to which the planter-runner penetrates to break up the clods and smooth the ground upon each side of the planter-runner. The forward ends 3 of the gage-plates are bent to parallel positions and provided with openings 4 near their lower edges, and the clevis 5 is placed in position to embrace said parallel ends, and the set-screws 6, screw-seated in the clevis, pass through the openings 4 and engage the sides of the runner. Countersinks 7 are formed in the points of the set-screws 6, so as to make annular cutting edges to more firmly grip the runner. By manipulating the set-screws 6 the gage-plates may be raised and lowered relative to the runner. The vertical standards 8 are provided with a series of openings 9, and a spacing-block 10 has laterally-projecting ears 11, provided with openings 12, and bolts 13 are inserted through desired ones of said openings 9 and desired ones of said openings 12 to locate the spacing-block 10 relative to the standards 8.

A vertical arm 14 extends downwardly from the center of the spacing-block 10 and is provided at its lower end with a slot 15, adapted to receive the planter-runner, and set-screws 16, screw-seated transversely of the slot 15, provide means of gripping the runner. By moving the bolts 13 up or down in the openings 9 of the standards 8 the depth of the planter-runner relative to the lower faces of the gage-plates is regulated, and by moving said bolts 13 forwardly or backwardly in the openings 12 the device is adjusted for longer or shorter planter-runners.

The hoes or coverers 18 are placed against the inner faces of the gage-plates 1, and bolts 17, inserted through the gage-plates, through the forward ends of the hoes, and through the lower ends of the standards 8, connect the parts securely together and form pivots upon which the hoes may swing upwardly or downwardly, and shoulders 17$^a$ extend outwardly from the standards 8 and engage the upper edges of the gage-plates, said shoulders serving to hold the standards 8 rigidly in their vertical positions. The hoes are curved inwardly as they extend backwardly from the gage-plates, and the rear parts of the hoes are provided with downward projections 19 and are adapted to engage the soil below the surface formed by the gage-plates and throw the soil into the furrow made by the planter-runner. A series of squared openings 20 are located in vertical alinement in the rear ends of the gage-plates 1, said openings connecting with each other by vertical passages 22, the bolts 21 having squared portions 23 adapted to fit in the squared openings 20, and said bolts are inserted through the gage-plates 1 and through the hoes 18, and nuts 24 are screw-seated upon their inner ends. When the nuts 24 are loosened, the squared portions 23 may be withdrawn from the squared openings 20, and then the circular necks 25 will pass upwardly or downwardly through the passages 22 to raise or lower the hoes, and then the nuts may be tightened, drawing the squared portions 23 into the openings 20 and firmly holding the hoes in their adjusted positions relative to the gage-plates.

I desire to call especial attention to the advantages of the adjustable pivoted connection between the hoes and the gage-plates. Heretofore there has been great difficulty in holding the hoes in the desired positions. If an ordinary bolt is used, with a smooth slot through the gage-plate, instead of the squared openings 20 and vertical passages 22, it is almost impossible to hold the hoes in position, and I have found by actual practice that the use of the squared openings, with the bolts 13, is very effective and satisfactory and that by the use of the vertical passages from one squared opening to the other it is only necesary to slightly loosen the nuts, so that the squared portions of the bolts may be withdrawn from the squared openings, and then the hoes may readily be raised or lowered. The pivoted connection between the hoes and gage-plates formed by the bolts 17 adds greatly to the strength of this connection over the devices employing only single bolts. I also call especial attention to the importance of the shoulders 17$^a$, holding the standards 8 in their vertical positions. Heretofore sheet-metal straps have been used, and it has been found very difficult to hold said straps in vertical positions.

I claim—

1. In a gage-plate attachment for planters and drills, the gage-plates 1 having the curved lower faces 2, the hoes 18, the standards 8, the bolts 17 inserted through the gage-plates through the forward ends of the hoes and through the lower ends of the standards, the spacing-block 10 adjustably connected to the standards 8, and the shoulders 17$^a$ extending from the standards 8 and engaging the upper edges of the gage-plates to hold the standards in vertical positions, substantially as specified.

2. In a gage-plate attachment for planters and drills, the gage-plates 1 having the curved lower edges 2; the hoes 18; the bolts 17 pivotally connecting said hoes to the gage-plates, there being squared openings 20 arranged in vertical alinement in the rear ends of the gage-plates, and there being vertical passages 22 connecting said openings 20; and the bolts 21 inserted through the openings 20 and through the runners, and having nuts 24 upon their inner ends, said bolts having squared portions 23 to engage in the squared openings 20 and having necks 25 to pass through the passages 22 to adjustably and rigidly connect the hoes to the gage-plates, substantially as specified.

In testimony whereof I affix my signature in presence of two witnesses.

DAVID R. VIVION.

Witnesses:
EDWARD E. LONGAN,
M. G. IRION.